July 15, 1941.  L. B. GARDNER  2,249,557
COMBINED STACKER AND BUCK RAKE
Filed May 9, 1939   3 Sheets-Sheet 1
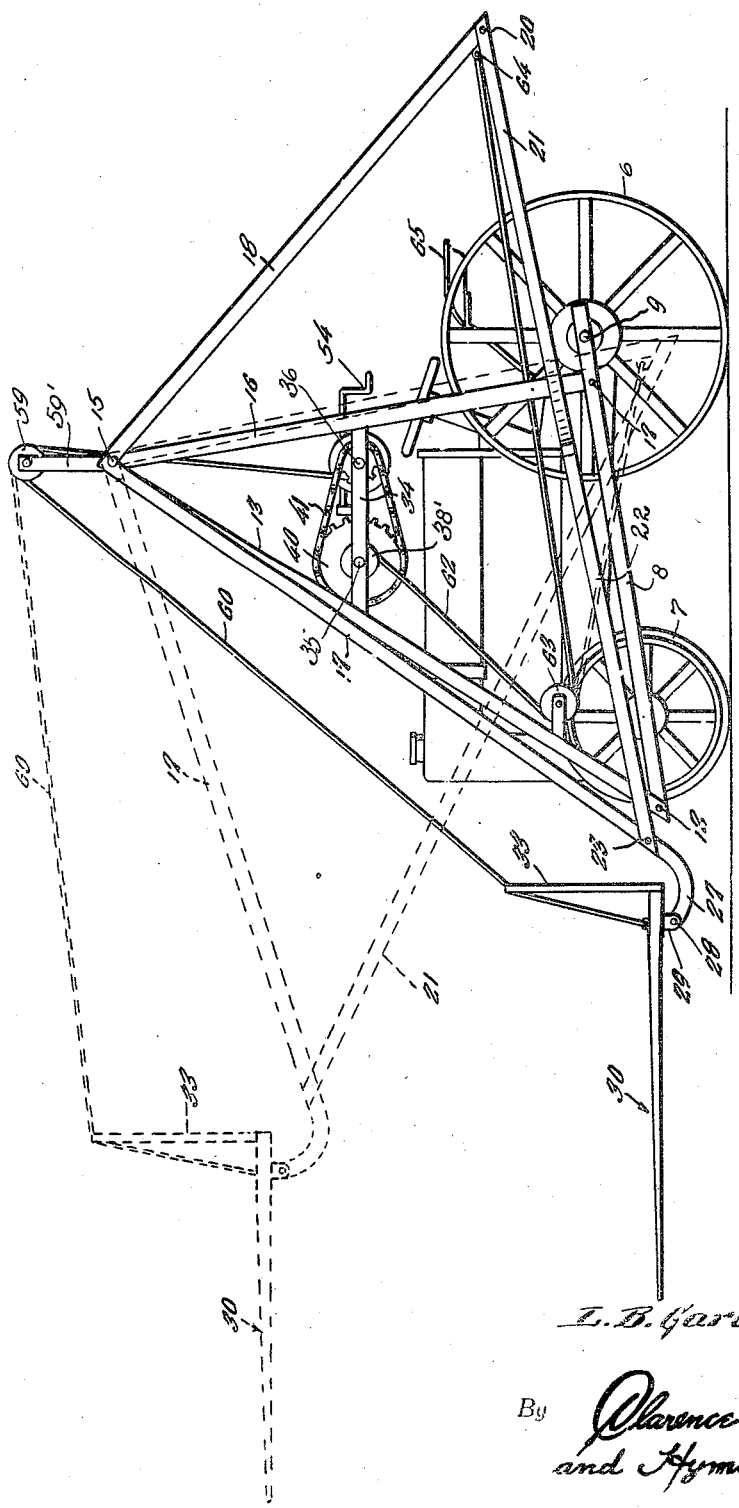
Inventor
L. B. Gardner
By Clarence A. O'Brien
and Hyman Berman
Attorneys

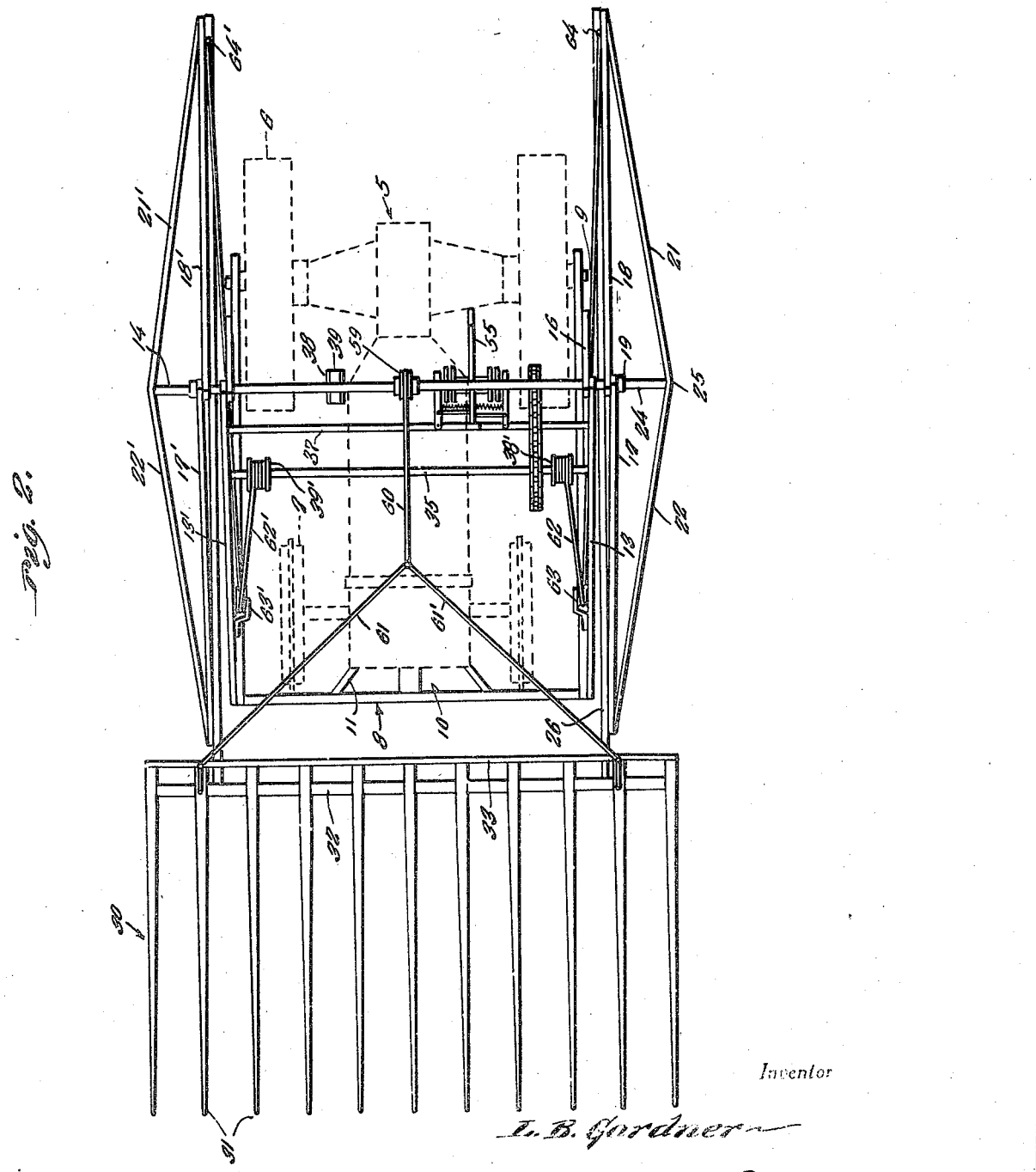

July 15, 1941.  L. B. GARDNER  2,249,557
COMBINED STACKER AND BUCK RAKE
Filed May 9, 1939   3 Sheets-Sheet 3
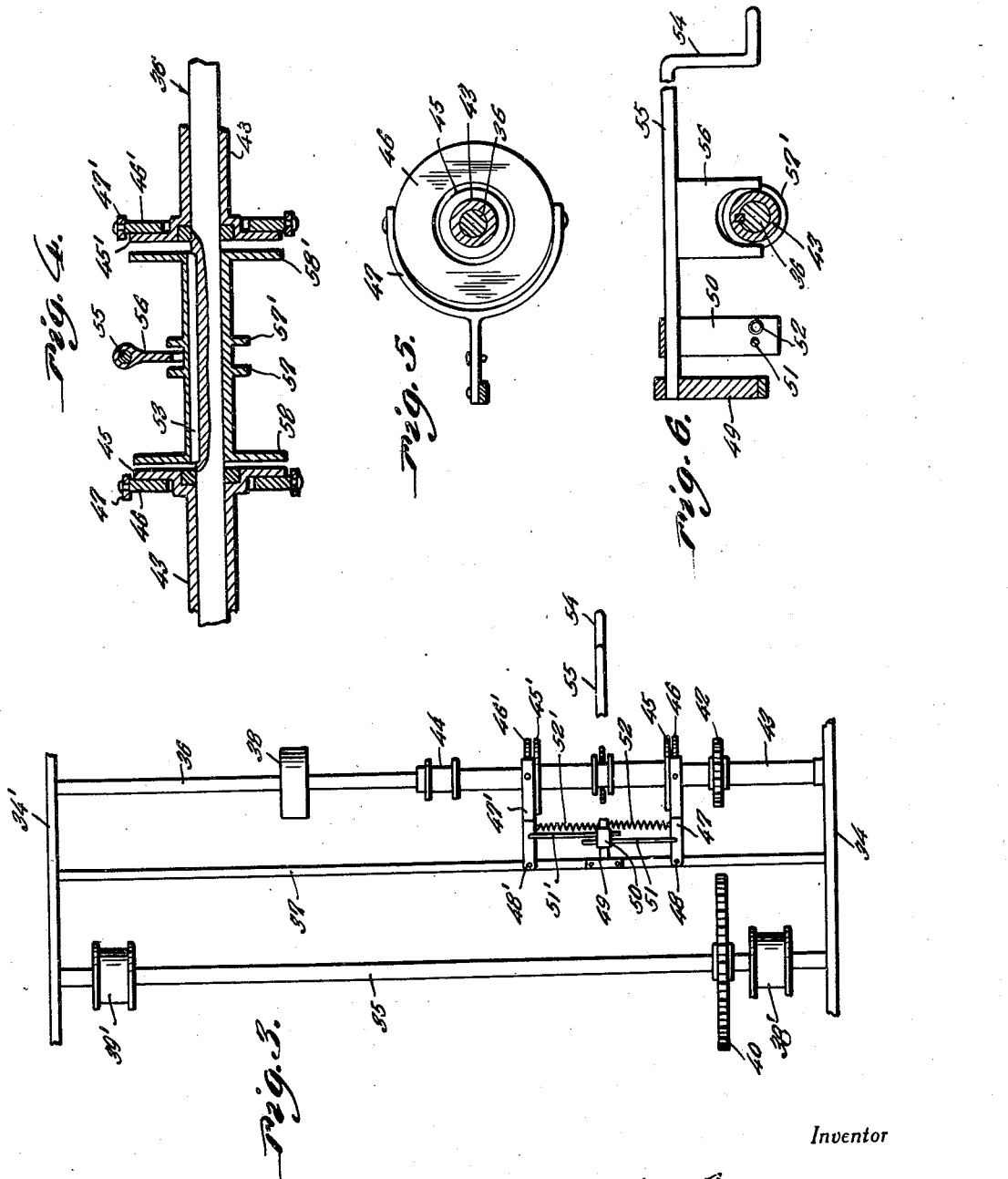
Inventor
L. B. Gardner
By Clarence A. O'Brien
and Hyman Berman
Attorneys Patented July 15, 1941

2,249,557

UNITED STATES PATENT OFFICE 2,249,557

COMBINED STACKER AND BUCK RAKE

Luke B. Gardner, Moore, Mont., assignor of one-half to Charles E. Gardner, Moore, Mont.

Application May 9, 1939, Serial No. 272,691

1 Claim. (Cl. 214—140)

My invention relates to a combined stacker and buck rake arrangement for mounting upon and operation by a conventional farm tractor, to act as an ordinary buck rake in the field in gathering hay or shocked grain, and to act as a stacker at the stack or feeder to raise and deposit its load on the top of the stack or onto the feeder of the threshing machine, and an important object of my invention is to provide a simple, practical, and inexpensive arrangement of the character indicated.

Other important objects and advantages of my invention will be apparent from a reading of the following description in connection with the drawings wherein the preferred embodiment of the invention is shown for illustrative purposes.

In the drawings:

Figure 1 is a general side elevational view showing the invention applied to a conventional type of farm tractor, the arrangement being shown in raking position in full lines and in stacking position in dotted lines.

Figure 2 is a top plan view of Figure 1 with the tractor shown partly in dotted lines.

Figure 3 is an enlarged top plan view of the cable operating and clutch mechanism.

Figure 4 is an enlarged longitudinal vertical sectional view taken through the clutch.

Figure 5 is a transverse vertical sectional view.

Figure 6 is a transverse vertical sectional view taken at one side of the clutch operator.

Referring in detail to the drawings, the numeral 5 generally designates a conventional type of farm tractor having the rear wheels 6 and the front wheels 7. A U-shaped frame 8 is mounted on the said tractor with a rear ends of its legs connected to and mounted on the axle structure 9 related to the rear wheels 6, while the bight portion 10 of the said frame is mounted by means of a suitable number and arrangement of bars 11 to the front part of the frame of the tractor and in front of the tractor, the legs of the said frame having a slight forward declination as clearly indicated in Figure 1 of the drawings. The outer side of the front end of the said frame has pivoted thereto at each side thereof as indicated by the numeral 12 the lower end of the upwardly and rearwardly inclined bar 13 which is connected at its upper end on the transverse shaft 14 at the point designated by the numeral 15, and from this main point depends the substantially vertical bar 16 which is connected at its lower end at the point 17 to the respective leg of the frame 8 at a point forward of the tractor axle 9. Pivotally connected at their upper ends to outboard portions of the shaft 14 at the outer sides of the vertical frames constituted by the bars 13 and 16 are the forwardly and rearwardly declining bars 17 and 18, respectively, of the tiltable rake supporting frames. The bars 17 and 18 have their upper ends maintained in position on the shaft 14 by stop collars 19 fixed to the said shaft. The lower end of the bar 18 is pivotally connected as indicated by the numeral 20 to the rear end of a laterally outwardly angulated bar 21 which joins the rear end of a similarly and oppositely laterally outwardly arranged bar 22 which has its front end pivoted as indicated by the numeral 23 to the lower end portion of the bar 17. A brace 24 extends between the apex portion 25 constituting the junction of the bars 21 and 22 and is connected with the bar 26 which is also connected at the points 20 and 23 to the lower ends of the bars 17 and 18 with the bar 26 lying in substantially the same general horizontal plane as the bars 21 and 22. The lower end of the bar 17 below the pivot 23 is curved downwardly forwardly and upwardly as indicated by the numeral 27 and on its terminal has a pivot 28 in conjunction with a bracket 29 which is fastened to the frame of the rake which is generally designated 30. An exactly similar arrangement of bars obtains at the opposite side of the arrangement, the bars on the opposite side of the arrangement being designated by correspondingly primed numerals.

The rake 30 comprises the forwardly tapered tines 31 which are separated and connected by a bar 32 engaging their rear ends, and on the rear extremity of the tines is connected a backboard 33 which is related to the tines at approximately right angles and rises thereabove to a suitable height.

Each stationary side frame structure is provided with a horizontal longitudinal member 34 which extends between and is connected to the bars 13 and 16 and journaled in these elements 34, 35', respectively, are the large diameter front shaft 35, a smaller diameter shaft 36, and the intermediate support rod 37. The shaft 36 has at the appropriate side thereof a power pulley 38 which is connected by a belt 39 to the power take off (not shown) of the tractor, while the shaft 35 has adjacent opposite ends thereof the respective cable drums 38' and 39' and adjacent the left end thereof the relatively large sprocket wheel 40 over which is trained a sprocket chain 41 which is, in turn, trained over a smaller sprocket wheel 42 which is fixed on one section of a sectional tubular overrunning shaft 43 which turns on the shaft 36. The other section of this overrunning shaft 43 has adjacent and overlying the middle of the tractor a cable drum 44 and the inner ends of the sections have fixed thereto the brake stator disks 45 and 45' and which disks have related thereto the movable brake elements 46 and 46', respectively, which are located outboardly of the stators as indicated in Figure 4 of the drawings and have pivoted thereto on a vertical axis the forks 47 and 47' which are pivoted as indicated by the numerals 48 and 48' to appropriately spaced points on the support rod 37. Between the points 48 and 48' the rod 37 has mounted thereon a bracket 49 which terminates in a slide support 50 which has openings slidably receiving respective guide rods 51 and 51' which are connected to the forks 47 and 47', respectively, in connection with positioning springs 52 and 52' which operate to restore the forks 47 to the initial position after operation of the clutch in a manner to be described.

As indicated in Figure 4, there is located on the shaft 36 between the stators 45 and 45', a rotor which is splined as indicated by the numeral 53 to the shaft 36 and is normally situated so as to be spaced at its opposite ends from the said stators and is selectively engageable as to its opposite ends with the stators upon swinging of the crank 54 on the clutch operating shaft 55 which is rotatably mounted as indicated in Figure 6 in the bracket 49 and passes through the support 50, the said rod having a depending yoke 56 which is disposed between the companion annuli 57 and 57' formed on the central portion of the said rotor. On opposite ends of the said rotor are disks 58 and 58' which are adapted to conformably engage the stators 45 and 45' according to the direction in which the crank 54 is swung, so as to operate either the cable drum 44 or the cable drums 38' and 39', according to the adjustment of the rake desired. The shaft 14 carries at the middle portion thereof a standard 59' which supports a pulley 59 over which is trained a cable 60 which is wound on the drum 44, the opposite end of the cable 60 being divided in two branches 61 and 61' which are connected as indicated in Figures 1 and 2 with outlying tines of the rake 30. Other cables 62 and 62' are anchored as indicated by the numerals 64 and 64' to rearward portions of the members 21 and have their opposite ends wound around the drums 39 and 39' on the shaft 35, the means designated by the numerals 63 and 63' comprising pulleys over which the cables 62 and 62' are trained, these pulleys being carried by the members 13 and 13'.

It will be obvious that when the crank 54 is swung in a direction to operatively connect the left hand section of the tubular shaft 43 to the tractor driven shaft 36, the shaft 35 will be turned in a direction to cause the drums 39 and 39' thereon to wind the corresponding cables 62 and 62' thereon and cause the front part of the swingable frame to swing in a forward and upward direction, thereby carrying the rake 30 upwardly to such a position as is exemplified in the dotted lines in Figure 1 of the drawings, in which position the brake disk 46 will hold the corresponding portion of the shaft 43 from turning, so that the position of the rake will be maintained and the clutch left free to be operated to operatively connect the remaining portion of the shaft 43 for adjusting the relative angulation of the rake with respect to the horizontal by means of the cable 60 and the drum 44 which is fixed on the right hand section of the hollow shaft 43 and on which the cable 60 is wound.

It will be obvious from the foregoing that the operator of the tractor may reach the crank 54 which is located conveniently with respect to the driver's seat 65 on the tractor, and can during the forward progress of the tractor adjust not only the elevation but also the tilt angle of the rake 30 at will, and by disengaging the clutch from either of the two described operative connections, cause the adjustment procured to persist until another operation of the clutch mechanism, by reason of the spring tensioned action of the brakes.

Although I have shown and described herein a preferred embodiment of my invention, it is to be definitely understood that I do not desire to limit the application of the invention thereto, and any change or changes may be made in the materials and in the structure and arrangement of the parts consisting with the scope of the subjoined claim.

Having described the invention, what is claimed as new is:

In an attachment for a tractor, a pair of upright frames, one at each side of the tractor, means for connecting the lower ends of said frames to the tractor, a pair of swingable frames, one at each side of the tractor, means for pivotally connecting the upper ends of said swingable frames to the upper ends of the first-mentioned frames, a rake carried by the front lower ends of the swingable frames, a shaft carried by the upright frames, drums on the shaft, cables connected with the drums and with the swingable frames for swinging such frames when the shaft is rotated to raise the rake, a second shaft carried by the upright frames, means for rotating the second shaft, a sectional tubular shaft mounted on the second shaft, means for connecting one of the sections with the first-mentioned shaft to rotate the same when said section is rotated, a drum on the second section of the tubular shaft, a cable connected with the drum and with a part of the rake and tilting a rake when the drum is rotated, a combined clutch and brake disk on the inner end of each section of the tubular shaft, a spool-like member carried by the second shaft and having its ends forming clutch disks, manually operated means for moving the spool-like member into engagement with either one of the first-mentioned clutch disks, brake members engaging the first-mentioned clutch disks, spring means for normally holding the brake members in engagement with the clutch disks and means for moving a brake member out of engagement with the clutch disks when an end of the spool-like member is moved against such disks.

LUKE B. GARDNER.